April 2, 1968  R. D. KOPA  3,376,027
FUEL ATOMIZING CARBURETORS
Filed Feb. 19, 1964  7 Sheets-Sheet 2

INVENTOR.
RICHARD D. KOPA
BY Forrest J. Lilly
ATTORNEY

INVENTOR.
RICHARD D. KOPA
BY Forrest J. Lilly
ATTORNEY

April 2, 1968

R. D. KOPA 3,376,027

FUEL ATOMIZING CARBURETORS

Filed Feb. 19, 1964

INVENTOR.
RICHARD D. KOPA
BY Forrest J. Lilly
ATTORNEY

INVENTOR.
RICHARD D. KOPA
BY Forrest J. Lilly
ATTORNEY

United States Patent Office 3,376,027
Patented Apr. 2, 1968

3,376,027
FUEL ATOMIZING CARBURETORS
Richard D. Kopa, Van Nuys, Calif., assignor to The Regents of The University of California, a corporation of California
Filed Feb. 19, 1964, Ser. No. 345,881
10 Claims. (Cl. 261—145)

ABSTRACT OF THE DISCLOSURE

A carburetor having a fuel atomizing means and a device for mixing exhaust gas with the air-fuel mixture. A linkage for operating the needle valve which controls fuel flow in unison with the throttle valve is provided and a dashpot is included in the linkage for resisting opening movement of the throttle.

---

This invention is concerned generally with improving carburetion in internal combustion engines, particularly gasoline powered motor vehicle engines, for the purpose of reducing air pollution created by such engines. The invention relates more specifically to improved fuel atomizing carburetors which are effective to substantially reduce the major atmosphere contaminants emitted by internal combustion engines.

In recent years, air pollution has become a major problem, both in the United States and abroad. Of primary concern, of course, is the detrimental effect of air pollution on health. In an effort to reduce air pollution, many studies and research programs have been undertaken, and other programs are currently in progress, for the purpose of determining the causes of air pollution and reducing the contaminants emitted by such sources. As a result of such programs, it is now known that internal combustion engines, particularly gasoline powered motor vehicle engines, constitute a major source of air pollution. Estimates based on the extrapolation of air pollution data obtained from extensive studies in the Los Angeles area of California, for example, have yielded the following figures for the nationwide annual discharge of contaminants into the atmosphere from gasoline powered vehicles:

| | Tons |
|---|---|
| Carbon monoxide | 90,000,000 |
| Hydrocarbons | 12,000,000 |
| Nitrogen oxides | 4,500,000 to 13,500,000 |
| Aldehydes | 150,000 |
| Sulfur compounds | 150,000 to 300,000 |
| Organic acids | 60,000 |
| Ammonia | 60,000 |
| Solids | 9,000 |

It is apparent from the above data that the three major contaminants emitted by motor vehicles are carbon monoxide, hydrocarbons, and nitrogen oxides. A reduction in these contaminants, therefore, would constitute a marked advance in the conquest of air pollution.

Prior and current attempts to control harmful motor vehicle emissions have involved various techniques which may be generally classified as follows:

(I) Exhaust emission control
   (A) Engine operation control
      (1) Improved carburetion
   (B) Exhaust control
   (C) Fuel modification
(II) Blow-by control
(III) Non-exhaust emission control This invention achieves exhaust emission control, specifically reduction of unburned hydrocarbons, carbon monoxide, and nitrogen oxides, through improved carburetion. Broadly speaking, the improved carburetors of the invention achieve such contaminant reduction by utilization of two known concepts. The first concept is that of introducing exhaust gas, or other inert fluid, either liquid or gaseous, into the air-fuel mixture entering the engine to reduce the peak combustion temperature of the mixture and, thereby, the formation of nitrogen oxides. The second concept is that of creating a homogeneous mixture of the air, fuel, and exhaust gas entering the engine cylinders so as to permit engine operation at a more lean air-fuel ratio and thereby effect more complete combustion of the hydrocarbons in the fuel and reduce the formation of carbon monoxide. To enable a more complete understanding of the invention, there is presented below a brief discussion of the mechanics of contaminant formation in a gasoline engine utilizing conventional carburetion.

It has long been recognized that a conventional carburetor is effective to produce only partial vaporization of fuel. The primary reason for such incomplete vaporization is poor fuel atomization at the fuel injection nozzle. This results in an air-fuel mixture, at the outlet of the carburetor, which is composed partly of fuel droplets and partly of gasoline vapor. Some of these fuel droplets settle out or impinge the wall of the carburetor and intake manifold and form a film which flows along the carburetor wall onto the intake manifold wall where the fuel is vaporized by the elevated temperatures in the manifold. The fuel vaporization which occurs in the intake manifold, however, is not uniform, due primarily to the pulsating air flow in the manifold which results from sequential opening of the engine intake valves. Because of this non-uniform fuel vaporization in the intake manifold, the fuel is not evenly distributed to the individual engine cylinders.

Such non-uniform fuel distribution requires the engine carburetor to be adjusted to a slightly richer air-fuel mixture than is theoretically necessary for satisfactory engine operation. For example, the stoichiometric air-fuel ratio for gasoline is 15:1. Actually, it is preferable to operate a gasoline engine at an air-fuel ratio which is slightly more lean than the stoichiometric ratio, to provide excess oxygen and thereby assure complete combustion of the hydrocarbons. A conventional carburetor, on the other hand, must be set for an air-fuel ratio in the range of 14:1 to 12:1. At these rich air-fuel ratios, there is insufficient oxygen present in the cylinders to effect complete combustion of the fuel. As a result, unburned hydrocarbons and carbon monoxide are exhausted from the cylinders.

It is apparent at this point, therefore, that the emission of unburned hydrocarbons and carbon monoxide from a gasoline engine may be reduced by operating the engine at a more lean air-fuel ratio, preferably a ratio slightly in excess of the stoichiometric ratio. It is further apparent that engine operation at such lean air-fuel ratios requires uniform fuel distribution to all cylinders.

Such a high degree of uniform fuel distribution can be realized only if the air-fuel mixture entering the intake manifold is a homogeneous mixture in which the gasoline is substantially totally vaporized so that there is no fuel separation. Complete fuel vaporization, in turn, requires extremely efficient fuel atomization at the fuel injection nozzle. For example, under the temperature and pressure conditions existing in a standard carburetor, the fuel must be atomized to droplet diameters on the order of a few microns in order to be fully vaporized.

The present improved carburetors are equipped with pneumatic fuel atomizing nozzles which attain this high degree of atomization by atomizing the fuel with a secondary fluid stream. While this technique of pneumatic fuel atomization is known in the art, it has not been successful in the past in attaining uniform fuel distribution to the engine cylinders for the reason that fuel separation from the induction air stream still occurred in the mixing chamber because of an excessive contact of the atomized fuel droplets with the carburetor walls before complete vaporization could occur.

One important aspect of this invention is concerned with the pneumatic fuel atomizing system which is improved to secure superior fuel atomization. Another important aspect of the invention is concerned with the mixing chamber which is uniquely constructed to avoid contact of the atomized fuel droplets with the carburetor walls prior to vaporization. The end result, therefore, is a more homogeneous air-fuel mixture and more uniform fuel distribution to the engine cylinders, whereby the engine may be run with a more lean air-fuel mixture than is possible with conventional carburetors. The emission of unburned hydrocarbons and carbon monoxide is thereby substantially reduced.

As noted earlier, emission control of the nitrogen oxides is effected by introducing into the air-fuel mixture entering the engine an inert fluid, such as exhaust gas from the engine. The underlying reasons for the reduction in nitrogen oxide formation which results from the introduction of exhaust gas are well known in the art and, therefore, will not be treated in detail here. Suffice it to say that the introduced exhaust gas, or other inert fluid, reduces the heat value per pound of the combustible mixture, with the result that the peak combustion temperature is reduced. The total heat liberated during the combustion process, however, remains the same. In addition, the exhaust gas contains water vapor which disassociates during the combustion process into $O_2$ and $H_2$. This disassociation of the water vapor extracts energy from the air-fuel mixture in the cylinder, thereby further reducing the peak combustion temperature. During subsequent expansion of the mixture, the $O_2$ and $H_2$ recombine to form water vapor, thereby liberating heat which is returned to the mixture in the cylinder. As a result, the exhaust gas provides a heat sink in the engine cylinders which modifies the temperature-time history of the combustion process. In other words, the heat sink action of the recycled exhaust gases serves to flatten out the time-temperature curve of the combustion process. Nitrogen is a very inert gas and will not combine with oxygen, to produce nitrogen oxides, unless subjected to high temperatures. The relationship between the formation of the nitrogen oxides and the combustion temperature is an exponential one. Accordingly, even a small decrease in the peak combustion temperature results in a substantial reduction in the formation of nitrogen oxides.

As has already been noted, the technique of introducing an inert fluid, such as exhaust gas, into the air-fuel mixture is not new. In the past, however, it has been impossible to utilize this technique and still attain satisfactory engine operation. This was due to the fact that the air-fuel exhaust gas mixture entering the engine was not thoroughly homogenized and caused power surging because of uneven distribution to the cylinders.

A further important aspect of the present invention is concerned with an exhaust gas recycling system which is improved to attain a homogeneous mixture of air, fuel, and exhaust gas, whereby power surging is eliminated. A related important aspect of the invention is concerned with the method of recycling the exhaust gas, whereby the walls of the carburetor are heated by the entering exhaust gas to vaporize any fuel on the walls. Also, the exhaust gas merges with the entering fuel and air in such manner that pressure pulsations and turbulence in the exhaust gas are ineffective to impel the atomized particles in the mixture against the carburetor walls.

All induction methods of automotive pollutant control, of course, must be effective under two conditions, to wit, during steady state engine operation, e.g., cruising and idling, and during transient engine operation, e.g., acceleration and deceleration. Effective emission control during steady state engine operation is dependent, primarily, on the method of carburetion. It is this method of carburetion which has been the subject matter of the discussion thus far. Effective emission control during transient engine operation, on the other hand, is dependent primarily on the design of the control system for the carburetor. Conventional carburetors, for example, are equipped with primary controls, including the throttle, choke, and operating linkage therefor, and with compensating controls which are designed to be effective only during certain conditions of operation, such as deceleration, acceleration, at high speeds, low speeds, and so on.

A further important aspect of this invention is concerned with unique control systems for the present improved carburetors. These control systems are designed to maintain, in a novel way, the correct air-fuel ratio for optimum engine performance and optimum exhaust emission control throughout the entire operating range of the engine and during both steady state engine operation and transient engine operation. In regard to transient operation, for example, the present carburetor control systems are uniquely designed to enrich the air-fuel mixture during acceleration and to lean the mixture during deceleration. The normal compensating controls of a conventional carburetor, such as compensating jets, acceleration pump, auxiliary air valves, and the like, are eliminated.

It is a principal object of the invention, therefore, to provide improved atomizing carburetors for internal combustion engines which are effective to substantially reduce the exhaust emission of unburned hydrocarbons, carbon monoxide, and nitrogen oxides.

Another object of the invention is to provide improved atomizing carburetors wherein there is attained superior fuel atomization and a substantially more homogeneous mixture of fuel and induction air, thereby to attain more uniform fuel distribution to the engine cylinders and permit engine operation with a more lean air-fuel mixture without power surging than heretofore possible, whereby the emission of unburned hydrocarbons and carbon monoxide is appreciably reduced.

Yet another object of the invention is to provide improved atomizing carburetors having provision for exhaust gas recycling to reduce the formation of nitrogen oxides, and wherein the carburetors are uniquely designed to effect homogeneous mixing of the recycled exhaust gas with the air-fuel mixture, whereby optimum engine operation without power surging is obtained.

A further object of the invention is to provide improved atomizing carburetors having a unique control system for maintaining the proper air-fuel ratio throughout the operating range of a conventional internal combustion engine, and wherein the air-fuel mixture delivered to the engine is enriched during acceleration and made more lean during deceleration without the need for the usual compensating controls of a conventional carburetor.

Yet a further object of the invention is to provide improved atomizing carburetors which may be used on either gasoline powered engines or liquefied petroleum gas powered engines.

A still further object of the invention is to provide atomizing carburetors in which a portion of the fuel itself is gasified to serve as the atomizing gas for the liquid fuel.

A highly important object of the invention is to provide atomizing carburetors of the character described which are equipped with unique control systems for maintaining the proper air-fuel ratio throughout the entire range of engine operation.

Other objects, advantages, and features of the invention will become readily apparent to those skilled in the art as the description proceeds.

Briefly, the objects of the invention are attained by providing atomizing carburetors wherein the fuel is conducted from the float bowl to a fuel injection nozzle and into the path of secondary gas stream which atomizes the fuel to the desired droplet size and sprays the atomized fuel into the path of the main induction air. According to the preferred practice of the invention, the atomizing gas stream emerges from the nozzle at substantially sonic velocity since it has been determined that this velocity atomizes the fuel to a droplet diameter on the order of a few microns, as is necessary to obtain the high degrees of vaporization and homogenization of the air-fuel mixture contemplated in the present invention. The atomized fuel emerging from the atomizing nozzle and the main stream of induction air entering the carburetor flow axially through a mixing chamber or tube. This mixing chamber is preferably of increasing diameter in the direction of air flow in order to effect gradual deceleration of the entering air and atomized fuel and attain superior mixing of the air and fuel through momentum exchange therebetween. This venturi shape of the mixing chamber is also desirable since it conforms generally to the shape of the stream of atomized fuel from the atomizing nozzle, thereby minimizing impingement of the fuel droplets against the chamber walls. In addition, it creates a pressure suppression or reduction which is useful to induce flow of crankcase blow-by into the mixing chamber. According to one important aspect of the invention, the mixing chamber is axially proportioned to minimize impingement of the atomized fuel against the downstream end wall of the chamber. It has been determined, for example, that when the velocity of the atomizing gas is on the order of sonic velocity, the axial length of the mixing chamber should be at least substantially equal to 7 times its mean diameter in order to have the fuel droplets adequately vaporized by the time the downstream end wall of the chamber is reached.

The carburetors have provisions for introducing engine exhaust gas into the entering air-fuel to reduce the formation of nitrogen oxides. A second, and highly important aspect of the invention is concerned with the means for introducing the induction air and engine exhaust into the mixing chamber. According to this aspect of the invention, the air and exhaust gas enter the mixing chamber through a swirl cage coaxially disposed around the fuel injection nozzle. This swirl cage directs the entering air and exhaust gas generally tangentially to the mixing chamber, whereby the undirected, turbulent air and exhaust flow in the carburetor body is converted into a directed vortex or cyclonic flow within the mixing chamber. The atomized fuel is injected axially into the center of this vortex. This vortex flow of the air and exhaust gas through the mixing chamber is highly desirable since it stabilizes the flow pattern of the air and exhaust gases within the chamber and increases the effective length of the flow path through the chamber. In addition, the swirl cage minimizes or eliminates the tendency for pressure pulsations in the entering exhaust gas to impel the atomized fuel droplets radially against the mixing chamber walls. The exhaust gas entering the carburetor is conveyed in heat transfer relation to the wall of the mixing chamber, whereby any fuel droplets which do impinge the chamber wall are vaporized.

The design of the carburetors is such as to produce substantially complete vaporization of the fuel within the mixing chamber and, thereby, create a homogeneous mixture of the fuel, air, and exhaust gas. Substantially uniformity of fuel distribution to the engine cylinders is thereby attained. As a consequence, the engine may be operated with a more lean air-fuel mixture than is possible with a conventional carburetor, whereby the exhaust emission of unburned hydrocarbons and carbon monoxide is substantially reduced.

A further important aspect of the invention is concerned with the control systems of the carburetors for maintaining the proper air-fuel ratio throughout the operating range of the engine. In the illustrative forms of the invention, for example, the fuel atomizing nozzle is equipped with a metering pin or needle valve which is linked to the throttle valve in such manner that the valve and metering pin are simultaneously adjusted to maintain the desired air-fuel ratio as the throttle valve is adjusted to vary engine speed. Superimposed on this fuel metering action of the metering pin is a secondary fuel metering action which regulates fuel pressure as a function of the vacuum in the engine intake manifold. The secondary fuel metering action is effective to maintain the proper air-fuel ratio under certain conditions of engine operation, namely, when the engine intake manifold vacuum drops below 15 inches of mercury due to increased loading on the engine. The carburetor control systems are also effective to regulate exhaust gas flow to the carburetors in such manner that exhaust flow is cut off during idling and in response to adjustment of the throttle valve to its full open position. The carburetor control systems are designed to produce slight enrichment of the air-fuel mixture during acceleration and overleaning of the mixture during deceleration without the need for accelerating pumps, auxiliary fuel intakes, or other compensating means embodied in conventional carburetors.

In one illustrative form of the invention, the fuel is atomized by air. In a second illustrative form of the invention, a portion of the fuel itself is vaporized to produce the required fuel atomizing gas. The carburetors of the invention are designed for mounting on the standard carburetor fittings of motor vehicles.

A better understanding of the invention may be had from the following detailed description of certain presently preferred embodiments thereof, taken in connection with the annexed drawings, wherein:

FIG. 1 diagrammatically illustrates an improved carburetion system according to the invention and shows a present improved atomizing carburetor in vertical section;

Figure 1:
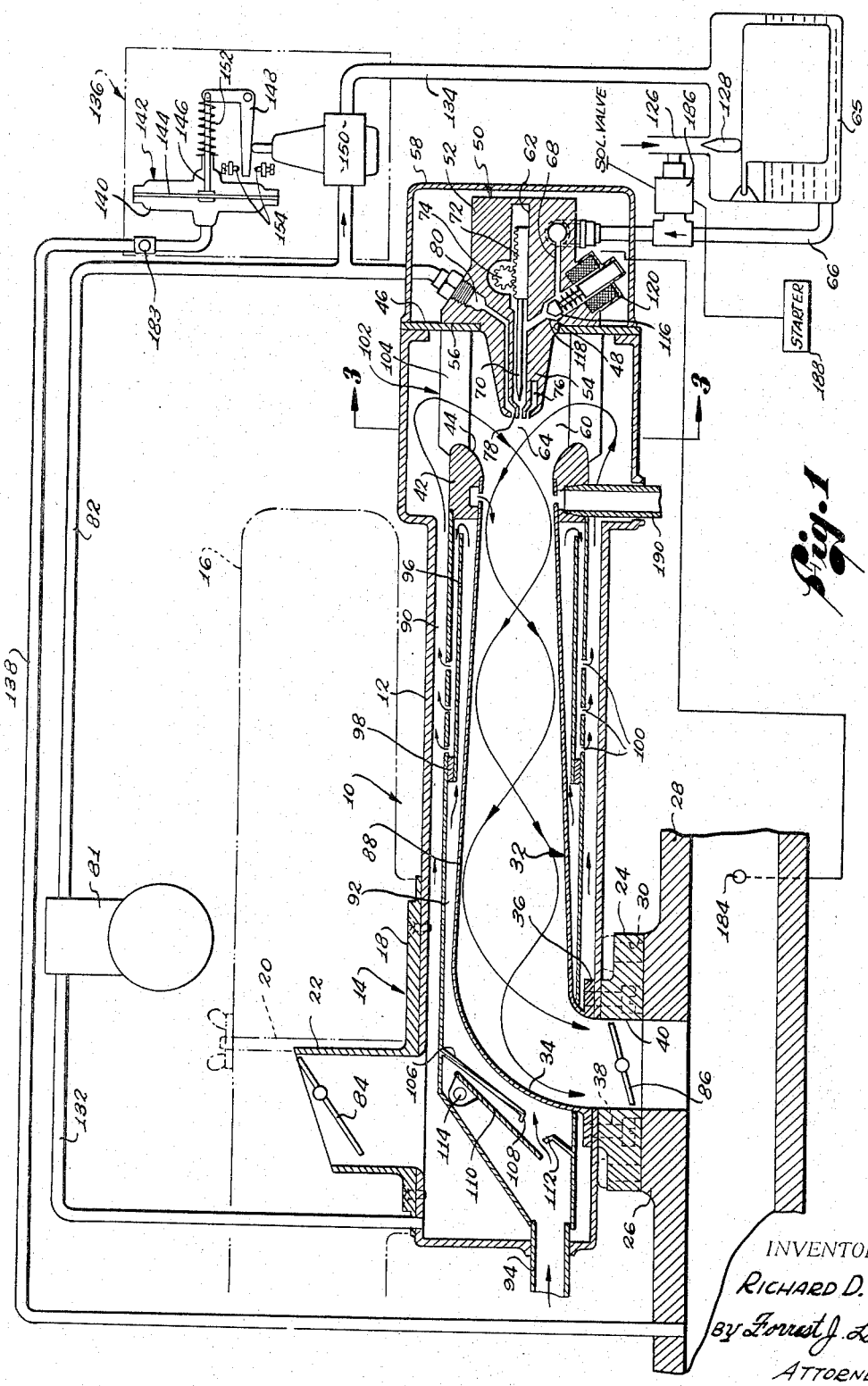

The atomizing carburetor 10 illustrated in FIGS. 1–4 of these drawings has an outer rectangular housing 12. On the upper wall of this housing, adjacent one end thereof, is a standard mounting 14 for an air cleaner 16. This mounting includes a circular mounting plate 18 to receive the base of the air cleaner and an upstanding post 20 with a nut threaded thereon for securing the air cleaner in place. Rising above the air cleaner mounting plate 18 is an air horn 22 through which air enters the carburetor housing 12. This air horn is coupled to the outlet of the air cleaner 16 to receive filtered air from the air cleaner, in the usual way. On the bottom wall of the carburetor housing 12 is a standard carburetor mounting flange 24 for seating against the carburetor mounting boss 26 on the intake manifold 28 of an internal combustion engine. Mounting flange 24 is apertured at 30 to receive bolts for attaching the flange to the manifold. The carburetor is preferably dimensioned so that it may be mounted on a conventional motor vehicle engine, in place of the standard carburetor, without in any way modifying the vehicle. Extending axially and horizontally through the carburetor housing 12 is a mixing tube or chamber 32. During operation of the carburetor, flow through the chamber occurs in the direction indicated by the arrow in FIG. 1. For reasons discussed earlier, and hereinafter explained in greater detail, the mixing chamber 32 preferably expands to a larger diameter in the direction of flow, as shown, to provide the mixing chamber with a venturi shape. The downstream end of the mixing chamber is turned at right angles to form a reducing elbow 34. This elbow has a mounting flange 36 which seats against the inner surface of the lower wall of the carburetor housing 12, directly opposite the housing flange 24. Flanges 24 and 36 are secured to one another and to the housing 12 by bolts 38. The reducing elbow 34 opens to the interior of the intake manifold 28 through a passage 40 in the flange 24. Encircling the inlet end of the mixing chamber 32 is a ring 42, the inner surface of which is tapered, or rounded, to define a flared mouth 44 on the mixing chamber. The ring is recessed to receive the mixing chamber, whereby the leading edge of the chamber is flush with the inner surface of the ring, as shown.

Mouth 44 of the mixing chamber 32 is spaced a distance from the adjacent end wall 46 of the carburetor housing. This wall has a central opening 48 axially aligned with the mixing chamber. Mounted on the outside of the end wall 46 is a fuel atomizing nozzle 50. This nozzle has a body 52 with a conical tip 54 which protrudes through the wall opening 48 toward the mouth 44 of the mixing chamber. About the tip 54 is an annular shoulder 56 which seats against the wall 46. The nozzle body 52 is secured to the wall 46 in any convenient way. Nozzle 50 is enclosed within a cover 58 which seats against the wall 46. Wall 46 and cover 58 may be bolted or otherwise secured to the adjacent end of the carburetor housing 12. Ring 42 on the mixing chamber 32 and the tip 54 of the atomizing nozzle 50 define therebetween an annular, generally tapered inlet passage 60 leading to the mouth 44 of the mixing chamber.

Extending axially through the nozzle body 52 is a bore 62. The end of this bore adjacent the mouth 44 of the mixing chamber 32 is reduced in diameter to form a fuel metering orifice 64. The shoulder between bore 62 and orifice 64 is preferably tapered, as shown. Fuel from a float bowl 65 is conducted to the nozzle body 52 through a fuel line 66. This line communicates with bore 62 through a passage 68 in the nozzle body. Axially movable in the bore 62 is a metering pin or needle valve 70. This needle valve is adapted to coact with the metering orifice 64 to regulate fuel flow into the mixing chamber 32. On the rear end of the needle valve 70 is a rack 72 engaged by a pinion 74 rotatably mounted within the nozzle body 52. Rotation of the pinion 74, therefore, is effective to axially position the needle valve 70 relative to the orifice 64, thereby to meter fuel flow through the orifice.

Surrounding the bore 62 is an annular cavity 76. This cavity opens toward the mixing chamber 32 through a restricted annular orifice 78. Communicating with orifice 78 is an inlet passage 80 which is supplied with pressurized atomizing gas. In the form of the carburetor under discussion, this atomizing gas is compressed air which is delivered to the passage 80, from an air pump 81, through an air line 82. As will be seen shortly, during operation of the carburetor, the air delivered to the atomizing nozzle 50 through the air line 82 expands at high velocity through the annular orifice 78. The air picks up fuel from the fuel metering orifice 64 and atomizes the fuel into fine droplets. It has been found that if the high pressure atomizing air emerges through the annular orifice 78 approximately at sonic velocity, or greater, atomization of the fuel to a droplet diameter of a few microns is attained. As noted earlier, this high degree of atomization results in a more homogeneous air-fuel mixture and, thereby, more uniform fuel distribution to the individual engine cylinders. Sonic velocity of the atomizing air is attained by compressing the air to a pressure which will create a critical pressure drop across the nozzle. In the carburetor under discussion, such a critical pressure drop and the resulting sonic flow of atomizing air are attained by compressing the air to a pressure in the range of 15–30 p.s.i.

Rotatably mounted within the inlet air horn 22 of the carburetor is a conventional choke valve 84. A throttle valve 86 is rotatably mounted within the passage 40 leading from the mixing chamber 32.

During operation of the carburetor 10, as it is thus far described, the induction air enters the carburetor past the choke valve 84 and flows longitudinally and externally of the mixing chamber 32, finally entering the mouth 44 of the chamber through the annular inlet passage 60 between the mouth and the conical tip 54 of the atomizing nozzle 50. Simultaneously, a high velocity stream of atomized fuel is discharged axially into the mixing chamber 32 from the atomizing nozzle 50. This stream of atomized fuel merges with the main stream of induction air entering the mixing chamber to produce an air-fuel mixture which emerges from the carburetor past the throttle valve 86 and immediately enters the intake manifold 28 of the engine.

As noted earlier, one important aspect of the invention is concerned with the shape and dimensions of the mixing chamber 32. Thus, according to the preferred practice of the invention, the mixing chamber 32 increases in diameter in the direction of air and fuel flow through the chamber to provide the chamber with the illustrated venturi shape. This venturi shape of the mixing chamber has a threefold advantage. First, the mixing chamber is effective to gradually decelerate the main induction air and the high velocity stream of atomized fuel entering the chamber so that superior mixing of the fuel and air, through momentum exchange therebetween, is realized. This permits maximum vaporization of the fuel to occur. A second advantage of the illustrated venturi shape of the mixing chamber 32 is that this chamber shape conforms generally to the expanding shape of the atomized fuel stream emerging from the atomizing nozzle 50. Accordingly, impingement of the atomized droplets of fuel against the wall of the mixing chamber is materially reduced or eliminated. The third advantage of the venturi shape of the mixing chamber resides in the fast that the internal pressure in the throat area of the chamber is reduced, thereby promoting vaporization of the fuel. As will be seen later, this suppression or reduction of the internal pressure in the mixing chamber is also useful for inducing flow of blow-by gases from the crankcase into the chamber.

According to a further feature of the invention, the mixing chamber 32 is axially dimensioned to minimize or eliminate direct impingement of atomized fuel against the wall of the reducing elbow 34. To this end, the length of the mixing chamber is made such as to assure deceleration of the high velocity stream of atomized fuel issuing from the atomizing nozzle 50, to the velocity of the main stream of induction air flowing through the mixing chamber, well in advance of the reducing elbow. As already noted, this reduction in velocity is affected by the venturi shape of the mixing chamber. It has been determined that when the atomizing air emerges from the atomizing nozzle 50 at about sonic velocity, the proper length of the mixing chamber 32 to avoid impingement of the atomized fuel against the reducing elbow is at least substantially equal to seven times the mean diameter of the chamber.

The carburetor structure thus far described is highly effective in reducing exhaust emission of unburned hydrocarbons and carbon monoxide. This is due to the superior fuel atomization produced by the pneumatic atomizing nozzle 50, the superior intermixing of the atomized fuel and induction air produced by the venturi mixing chamber 32 and by a later described cyclonic spinning of the induction air stream, and the dimensioning of this chamber, whereby impingement of the atomized fuel against the walls of the chamber is materially reduced or eliminated. Finally, as presently described, the walls of the mixing chamber are heated by recycled exhaust gases to a fuel vaporizing temperature, so that whatever fuel droplets do contact the chamber walls are immediately vaporized. These actions of the carburetor produce substantially total vaporization of the fuel within the mixing chamber and minimum separation of the fuel and impingement of the fuel against the fall of the chamber. As a result, a homogeneous air-fuel mixture enters the intake manifold 28 of the engine from the carburetor, so that substantially no fuel separation occurs within the manifold and substantially no fuel vaporization occurs from the walls of the manifold. This homogeneous mixing of the fuel and air and absence of fuel vaporization from the walls of the intake manifold result in substantially uniform distribution of fuel to the several engine cylinders. Accordingly, an engine equipped with the present carburetor may be satisfactorily operated with a more lean air-fuel mixture than is possible in engines equipped with conventional carburetors, whereby emission of unburned hydrocarbons and carbon monoxide in the engine exhaust is substantially reduced. The particular air-fuel ratio at which the present carburetor is designed to operate will be discussed shortly.

Another important aspect of the present invention is concerned with the design of the carburetor, whereby engine exhaust gas may be recycled, to minimize the formation of nitrogen oxides, without causing power surging of the engine. To this end, the mixing chamber 32 of the carburetor is enclosed in an engine exhaust duct 88. This exhaust duct is spaced from the carburetor housing 12 to define therebetween a generally annular passage 90 for the incoming induction air. The exhaust duct is also spaced from the mixing chamber 32 to define therebetween a generally annular passage 92 for the entering exhaust gas. The left-hand end of the exhaust duct 88 has a conduit 94 extending to the exterior of the carburetor housing 12 for connection to the engine exhaust system. The right-hand end of the exhaust duct 88 is secured to the ring 42 encircling the inlet end of the mixing chamber. Encircling the inlet end of the mixing chamber, between the latter and the exhaust duct 88, is an annular baffle 96. One end of this baffle is fixed to a ring 98 which, in turn, is fixed to the exhaust duct 88. The engine exhaust gas enters the exhaust duct 88 through the conduit 94 and flows along the outside of the mixing chamber 32, in counterflow relation to the flow of air and fuel within the chamber. The wall of the mixing chamber is thereby heated so that any liquid fuel which does contact the wall is vaporized. Upon reaching the inlet end of the mixing chamber, the direction of exhaust flow is reversed, the gas flowing between the baffle 96 and the wall of the exhaust duct 88, finally emerging into the inlet air passage 90 through a series of ports 100 in the duct. The exhaust gas is then premixed with the entering induction air and flows rearwardly with the latter, through the annular flow passage 60 at the inlet end of the mixing chamber, and finally into the mixing chamber through its mouth 44.

A highly important aspect of the invention is concerned with the method of introducing the mixture of air and exhaust gas into the mixing chamber 32 without causing immediate impingement of the atomized fuel emerging from the nozzle 50 against the walls of the chamber. Thus, the mixture of air and exhaust gas flowing toward the inlet of the mixing chamber is highly turbulent. In addition, the flow is pulsating due to free turbulence and the periodic opening and closing of the engine exhaust valves. If this turbulent and pulsating flow of air and exhaust gas were permitted to enter the mixing chamber in an uncontrolled manner, the turbulence and pressure pulsations in the flow would tend to drive the atomized fuel against the walls of the mixing chamber.

Figure 5:
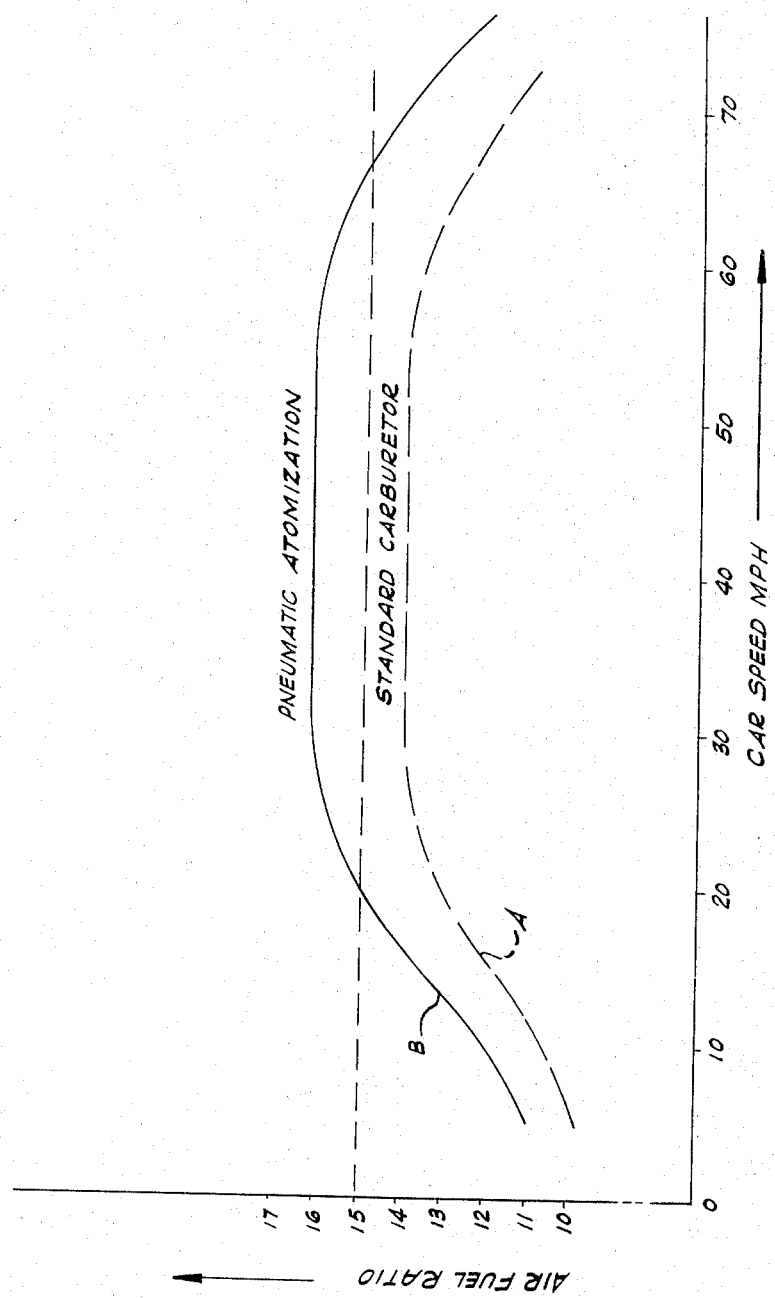
FIG. 5 is a graph illustrating the air-fuel ratio of a conventional carburetor and the air-fuel ratio of the present improved carburetors.

To avoid such fuel impingement against the mixing chamber walls, the premixed air and exhaust gas is introduced into the mixing chamber, according to the present invention, through a swirl cage 102. This swirl cage comprises, in effect a cylinder which extends from the mouth 44 of the mixing chamber 32 to the wall 46 of the carburetor housing 12. This cylinder may be integral with the ring 42. Extending through the swirl cage are a multiplicity of generally uniformly circumferentially spaced, tangentially directed flow slots 104. It is apparent, therefore, that the premixed air and exhaust gas enters the annular inlet passage 60 to the mouth 44 of the mixing chamber in a generally tangential fashion. This creates a vortex or cyclonic air and exhaust gas within the mixing chamber, as indicated at F in the drawing. The atomized fuel is directed axially into the center of this vortex. The swirl cage 102 and the vortex or cyclonic flow produced thereby have several advantages. The swirl cage reduces the turbulence in the entering mixture of air and exhaust gas. Because the air and exhaust gas enter the mixing chamber tangentially, the pressure pulsations in the mixture are ineffective to cause impingement of the atomized fuel against the chamber walls. The vortex flow within the mixing chamber also stabilizes the flow pattern of the air and exhaust gas and increases its effective length, whereby superior intermixing of the air, exhaust gas, and atomized fuel is realized. The vortex flow of the air-fuel stream through the mixing chamber aids in achieving this end in that any droplets of liquid fuel which remain in the stream as the latter approaches the downstream end of the chamber tend to be thrown radially out by centrifugal action against the heated wall of the chamber and thereby vaporized. Accordingly, the present carburetor is effective not only to achieve a homogeneous mixture of fuel and air, but a homogeneous mixture of fuel, air, and exhaust gas when the latter is recycled. Because of this homogeneous mixing of the fuel, air, and exhaust gas, the engine may be operated with a relatively lean air-fuel mixture to minimize the exhaust emission of unburned hydrocarbons and carbon monoxide, and the engine exhaust gas may be recycled, to suppress the formation of nitrogen oxides, without causing power surging of the engine. In FIG. 5, for example, curve A illustrates the air-fuel ratio of a typical gasoline engine equipped with a conventional carburetor. Curve B illustrates the air-fuel ratio possible with the present improved carburetor.

It is desirable not to recycle exhaust gas when idling and when the throttle valve 86 is rotated to its full open position. To this end, there is located within the inlet end of the exhaust duct 88 a partition 106 having an opening 108 therethrough. Pivotally mounted within the exhaust duct is a hinged valve or poppet 110. This poppet is rotatable between a closed position of seating engagement with a raised lip 112 about the opening 108 and an open position, wherein the poppet is spaced from the lip 112, to permit exhaust gas flow through the opening 108. Poppet 110 is moved between these positions by rotation of a shaft 114. The manner in which this shaft is rotated to position the poppet valve will be explained shortly.

When decelerating, or coasting downhill, it is desirable to cut off the flow of fuel to the atomizing nozzle 50. To this end, the nozzle includes a solenoid valve 116 which is engageable with a valve seat 118 about the fuel passage 68 to close the latter. Valve 116 is moved to its closed position in seating contact with the seat 118 by energizing of a solenoid 120. This solenoid is energized in response to intake manifold vacuum, as described later.

The control system 122 of the carburetor 10 will now be described. Float bowl 65 receives fuel from a fuel tank (not shown), via a fuel pump (not shown) through a fuel line 126. Flow of fuel into the chamber is regulated by a float valve 128 in the bowl, in the usual way, to maintain the correct fuel level in the bowl. As will be explained shortly, the needle valve 70 of the pneumatic fuel atomizing nozzle 50 and the throttle valve 86 are simultaneously adjusted by the throttle pedal of the motor vehicle in such manner as to maintain the proper air-fuel ratio. Simultaneous adjustment of the throttle valve and needle valve, however, is effective to maintain the proper air-fuel ratio only when the air flow through the carburetor remains constant for a given position of the throttle valve regardless of manifold vacuum. This condition of constant air flow for a given throttle valve position exists so long as the pressure drop across the throttle valve equals or exceeds the critical pressure drop at which variations in the downstream pressure, i.e., the intake manifold vacuum, produce no change in the air flow past the throttle valve. In a typical motor vehicle engine, this critical pressure drop occurs across the throttle valve when the intake manifold vacuum is 15 inches of mercury, or higher. Accordingly, as long as the intake manifold vacuum remains at 15 inches of mercury, or higher, adjustment of the needle valve 70, simultaneously with adjustment of the throttle valve 86 to vary engine speed is effective to maintain the proper air-fuel ratio.

When the manifold vacuum drops below 15 inches, however, due to increased loading on the engine, for example, the pressure drop across the throttle valve becomes less than the critical pressure drop with the result that variations in the intake manifold vacuum are reflected in variation in the air flow through the carburetor at a given throttle valve setting. In other words, for any given fixed position of the throttle valve, the air flow through the carburetor will vary as a function of manifold vacuum while the fuel flow remains relatively constant. In order to preserve the proper air-fuel ratio when the intake manifold vacuum drops below 15 inches of mercury, therefore, it is necessary to compensate the rate of fuel injection in relation to manifold vacuum.

This compensation of the rate of fuel injection is accomplished by pressurizing the float bowl 65 to expel the fuel therefrom to the fuel injection nozzle 50 and modulating the pressure in the float bowl as a function of intake manifold vacuum. Air pump 81 serves the dual function of supplying 15–30 p.s.i. pressurized atomizing air to the pneumatic fuel atomizing nozzle 50 and pressurizing the float bowl 65. The intake of pump 81 is connected, through an air line 132, to the interior of the carburetor housing 12. The discharge of the pump 81 is connected to the air line 82 leading to the air inlet 80 of atomizing nozzle 50. Float bowl 65 receives pressurizing air from the line 82 through a branch line 134 and a differential pressure transmitter 136.

Differential pressure transmitter 136 is effective to modulate the pressure of the air delivered to the float bowl 65 in relation to the vacuum in the intake manifold 28. To this end, differential pressure transmitter 136 communicates to the interior of the intake manifold through a conduit 138. This conduit connects to one chamber 140 of a pressure transducer 142 within the differential pressure transmitter 136. Within the transducer 142 is a flexible diaphragm 144 which is exosed to the vacuum in chamber 140 and connected through a link 146 to a bell crank 148. The other chamber of the pressure transducer is open to atmosphere. Bell crank 148 operates a pressure regulator 150 which controls the pressure of the air delivered to the float bowl 65 from the air line 82. The pressure transducer 142 is equipped with a spring 152 which normally urges the pressure regulator 150 to its closed position wherein minimum air pressure is transmitted to the float bowl 65. Stops 154 are provided for setting the limits of operation of the differential pressure transmitter 136. One stop limits the maximum pressure in the float bowl 65 when the vacuum in the intake manifold 28 exceeds 15 inches of mercury. The other stop limits the minimum pressure in the float bowl when the manifold vacuum drops to zero.

Air pump 81 and the fuel pump (not shown) for delivering fuel to the float bowl 65 are driven from the engine in any suitable manner. The capacity of the pump 81 exceeds the air flow requirements to the atomizing nozzle 50 and the float bowl 65. As noted earlier, in a typical carburetor according to the invention, the discharge pressure of pump 81 is in the range of 15 p.s.i. to 30 p.s.i. and is typically on the order of 20 p.s.i. It is evident, of course, that the discharge pressure of the fuel pump for delivering fuel to the float bowl 65 must exceed the normal pressure in the float bowl.

In operation of the fuel flow compensating system just described, variations in intake manifold vacuum are transmitted to the pressure transducer 142 through the conduit 138. The pressure transducer, in turn, adjusts the pressure regulator 150 in accordance with the manifold vacuum. When the manifold vacuum is less than 15 inches of mercury, so that the pressure drop across the throttle valve 86 is less than critical, adjustment of the pressure regulator 150 in response to changes in manifold vacuum produces corresponding changes in the pressure of the air delivered to the float bowl 65 from the air line 82. These changes in float bowl pressure, in turn, produce corresponding variations in the flow of fuel from the float bowl to the pneumatic atomizing nozzle 50. Thus, as the manifold vacuum increases, diaphragm 144 moves to the left in FIG. 1, thereby increasing air flow through the pressure regulator 150 and the pressure in float bowl 65. This increases the fuel flow to nozzle 50 and, therefore, the amount of fuel injected into the mixing chamber 32. Decreasing manifold vacuum has the opposite effect. Differential pressure transmitter 136 is so designed that this modulation of the internal float bowl pressure in response to intake manifold vacuum is effective to maintain the proper air-fuel ratio, for a given setting of the throttle valve 86, irrespective of changes in the manifold vacuum due to changes in the loading on the engine. If the throttle valve is adjusted to regulate engine speed, of course, the needle valve 70 in the atomizing nozzle 50 is simultaneously adjusted to maintain the proper air-fuel ratio. It is apparent, therefore, that adjustment of the needle valve 70 in the pneumatic atomizing nozzle 50 in response to adjustment of the throttle valve 86, and regulation of the air pressure within the float bowl 65 in response to changes in the intake manifold vacuum are effective to maintain the proper air-fuel ratio when the manifold vacuum is less than 15 inches of mercury.

When the vacuum in the intake manifold 28 equals or exceeds 15 inches of mercury, the bell crank 148 of the differential pressure transmitter 136 engages the lower stop 154 to limit the maximum pressure in the float bowl. The internal pressure in the float chamber now remains constant irrespective of changes in intake manifold vacuum. Under these conditions, the proper air-fuel ratio is maintained solely by simultaneous adjustment of the needle valve 70 in the atomizing nozzle 50 and the throttle valve 86. It will be recalled that when the intake manifold vacuum rises to 15 inches of mercury, or more, the pressure drop across the throttle valve becomes critical so that the air flow through the carburetor remains constant, irrespective of changes in the manifold vacuum, for any given setting of the throttle valve 86, so that the air-fuel ratio can be maintained solely by adjustment of the needle valve and throttle valve, as just explained.

The above-described simultaneous adjustment of the needle valve 70 in the pneumatic atomizing nozzle 50 and the throttle valve 86, and the regulation of the internal pressure in the float bowl 65 in response to intake manifold vacuum, for the purpose of maintaining the proper air-fuel ratio throughout the entire range of engine operation, constitutes a highly important feature of the invention.

Figure 4:
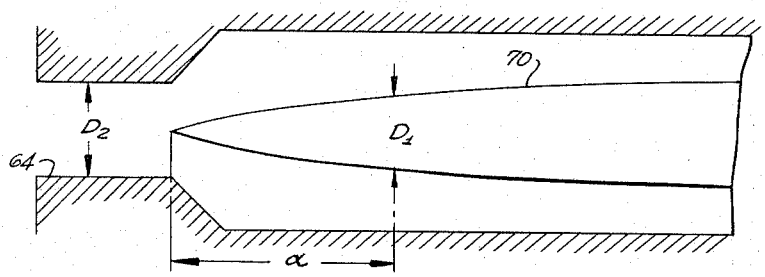
FIG. 4 is an enlarged axial section through a fuel metering needle valve in the carburetor in FIG. 1.
Figure 3:
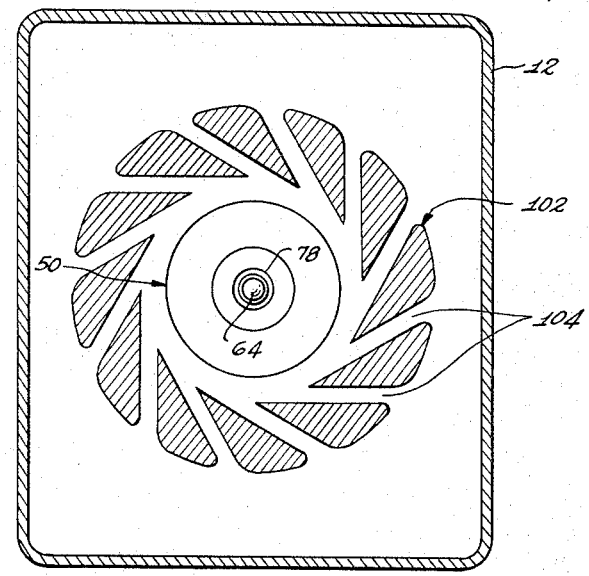
FIG. 3 is a section taken along line 3—3 in FIG. 1.

As already noted, the present atomizing carburetor 10 is effective to maintain the air-fuel ratio-speed relationship illustrated in solid lines in FIG. 5. It will be observed that the air-fuel ratio varies with speed, in approximately the same manner as the air-fuel ratio in a conventional carburetor Throughout the range of engine operation, however, the air-fuel ratio in the present carburetor is substantially more lean than that in the conventional carburetor. It is especially important to note that in the cruising speed range, i.e., between a vehicle speed of approximately 30 miles an hour and a vehicle speed of approximately 80 miles an hour, the air-fuel ratio in the present carburetor exceeds the stoichiometric ratio. The present carburetor, therefore, is highly effective in reducing the exhaust emissions of unburned hydrocarbons and carbon monoxide. It is apparent from FIG. 5 that the air-fuel ratio in the present carburetor is enriched for starting and idling and again for high speed operation, in the same way as in a conventional carburetor. This variation in air-fuel ratio with speed is accomplished by appropriate shaping of the needle valve 70 in the pneumatic fuel atomizer 50. FIG. 4 is an enlargement of the needle valve to show the valve shape necessary to attain the air-fuel ratio-speed relationship of FIG. 5. Mathematically speaking, in order to maintain a constant air-fuel ratio at different positions of the throttle valve 86, the effective flow area around the throttle valve and the effective flow area around the needle valve 70 in the pneumatic fuel atomizer 50 must be directly proportional. Since the effective flow area around the throttle valve is approximately a cosine function of its angular position, it follows that the effective flow area around the needle valve 70 has to be a cosine function of the needle valve position. This can be expressed mathematically as:

$$A = \pi/4(D_2^2 - D_1^2) = F(\cos \alpha)$$

where A is the effective fuel flow area around the needle valve 70, $D_2$ is the diameter of the needle valve seat, $D_1$ is the diameter of the needle at the position $\alpha$ and $\alpha$ is the distance from the tip of the needle expressed in degrees of angle rotation of the actuating pinion.

Modification of the proportionality function to attain the air-fuel ratio-speed relationship of FIG. 5 can be accomplished by modifying the shape of the needle valve 70, or by changing the geometry of the connecting linkage between the throttle valve and the needle valve.

Figure 2:
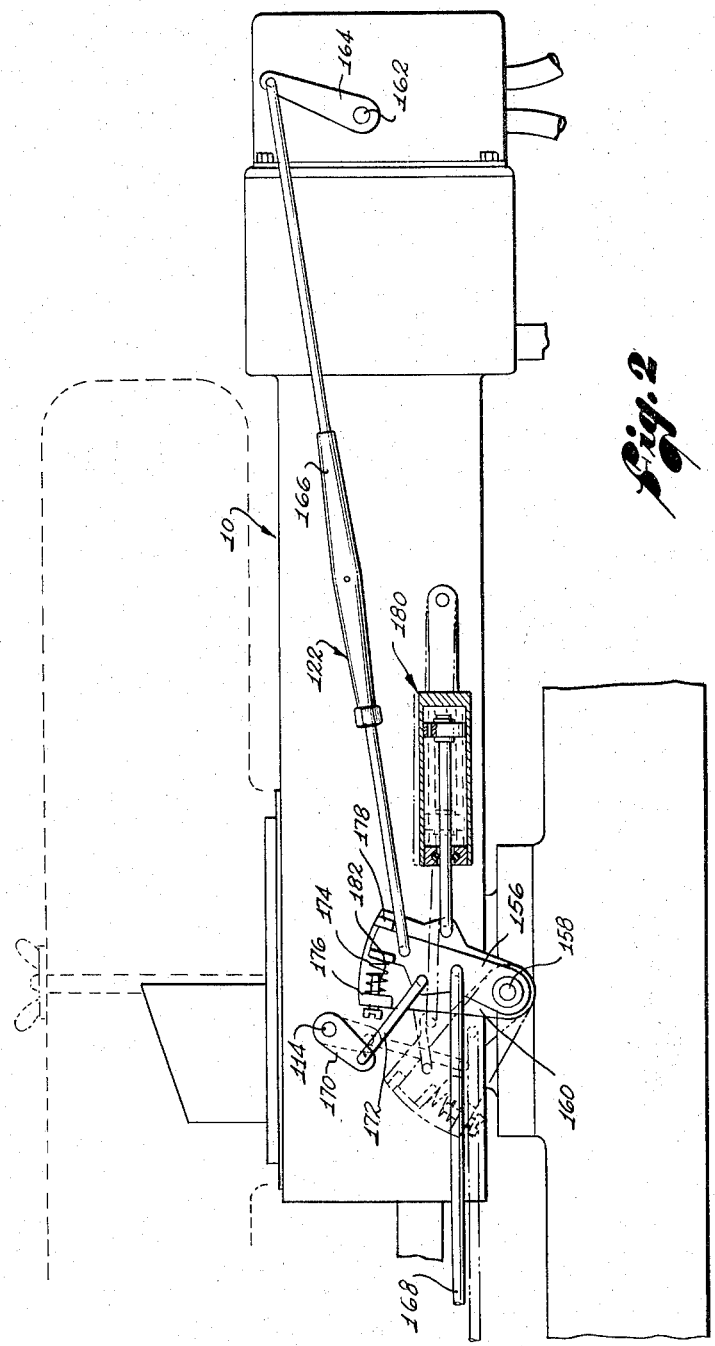
FIG. 2 is a side elevation of the carburetor in FIG. 1.

This connecting linkage will now be described by reference to FIG. 2. In this figure, the carburetor control system 122 will be seen to comprise an arm 156 which rotates on the shaft 158 of throttle valve 86. Keyed on the shaft 158, behind the arm 156, is a second arm 160. Keyed on the shaft 162 of the atomizing nozzle pinion 74 is an arm 164. The outer end of arm 156 and the outer end of arm 164 are interconnected by a longitudinally adjustable link 166. Pivotally connected to the arm 156, intermediate its ends, is a throttle rod 168. This rod connects to the accelerator pedal (not shown) of the motor vehicle, whereby pivotal motion of the pedal rotates the arm 156 in one direction or the other, depending upon whether the pedal is depressed or released. Keyed on the shaft 114 of the exhaust valve poppet 110 is an arm 170. The outer end of this arm is connected to the arm 156 by a link 172. It is apparent, therefore, that rotation of the arm 156 by the throttle rod 168 rotates the needle valve pinion 74 in the pneumatic fuel atomizer 50 to move the needle valve 70 back and forth and simultaneously rotates the exhaust valve poppet 110 toward and away from its seat 112. The geometry of the connecting linkage between the arm 156 and the exhaust poppet 110 is such that the latter is closed or nearly closed when the throttle arm 156 occupies its solid line idling position of FIG. 2. The poppet is progressively opened in response to initial counterclockwise rotation of the arm 156 in FIG. 2, in response to depression of the acceleration pedal, and then reclosed upon rotation of the arm 156 to its phantom line position in FIG. 2. This phantom line position of the arm corresponds to the wide open position of the throttle valve 86. It is apparent, therefore, that the exhaust poppet 110 is closed or nearly closed when the throttle valve 86 occupies its idling position, the valve is opened progressively in response to depression of the acceleration pedal to a certain point, and, finally, the exhaust poppet is reclosed in response to depression of the acceleration pedal to the floorboard. This results in smooth idling, and maximum power at full throttle.

It will be recalled that the arm 156 is rotatable on the throttle valve shaft 158. Accordingly, rotation of the arm in response to depression of the acceleration pedal does not directly rotate the throttle valve. Arm 160, however, is keyed on the throttle valve shaft 158 so that rotation of the latter arm does rotate the throttle valve. Arm 156 is connected to arm 160 through a spring 174. One end of this spring seats against the outer end of arm 156 and the other end of this spring seats against a flange 176 on the outer end of arm 160. Spring 174, therefore, urges the arm 156 in a clockwise direction relative to arm 160. Arm 160 has a stop 178 for limiting relative clockwise rotation of the arm 156. Operatively connected between the second arm 160 and the carburetor housing 12 is a dashpot or viscous damper 180, which preferably comprises a hydraulic dashpot, as shown.

During steady state operation of the engine, arm 156 rests against the stop 178 of the arm 160. If the acceleration pedal is slowly depressed to rotate arm 156 in the counterclockwise direction, the force of the spring 174 overcomes the resistance imposed on the arm 160 by the dashpot 180, whereby the arms 156 and 160 rotate as a unit to simultaneously adjust the needle valve 70 in the pneumatic fuel atomizer 50, the throttle valve 86, and the exhaust recycling poppet 110. If the acceleration pedal is suddenly depressed to accelerate, the arm 156 is rotated in a counterclockwise direction in FIG. 2. The dashpot 180, however, retards rotation of the arm 160 and thereby overrides the spring 174. As a result, the arm 156 rotates relative to the arm 160 until the outer end of arm 156 contacts an adjustable stop 182 on the end of arm 160. Arms 156 and 160 then rotate as a unit to open the throttle valve 86. The spring 174 thereafter gradually returns the arm 156 against the stop 178 on the arm 160. This relative rotation of the arm 156 with respect to the arm 160, which occurs during sudden acceleration, slightly retards the opening of the throttle valve 86 relative to the needle valve 70 of the pneumatic fuel atomizer 50 to temporarily enrich the air-fuel mixture entering the engine in order to supply the additional power required for acceleration. Return of the arm 156 against the stop 178 on the arm 160, by the spring 174, restores the normal air-fuel ratio of the carburetor.

The differential pressure transmitter 136 is also designed to enrich the air-fuel mixture during acceleration, as well as to lean the mixture during deceleration. To this end, the transmitter is equipped with a needle valve 183 in the vacuum line 138, just ahead of the pressure transducer 142, for restricting the vacuum line. This restriction slightly delays the response of the pressure transducer to changes in manifold vacuum. Thus, during acceleration, the vacuum in the pressure transducer chamber 140 reduces more slowly than in the intake manifold 28, whereby the air-fuel mixture is temporarily enriched. During deceleration, the vacuum in the pressure transducer 142 increases more slowly than in the intake manifold, whereby the air-fuel mixture is temporarily leaned.

As already noted, fuel flow to the atomizing nozzle 50 is cut off, by the solenoid valve 116, during deceleration and downhill coasting. To this end, the solenoid 120 for the fuel valve 116 is controlled by a pressure switch 184 operated by the manifold vacuum. Switch 184 is closed, to energize the valve solenoid 120 and close the valve 116, when the intake manifold vacuum rises to a given level, which is typically on the order of 20 inches of mercury.

When starting the engine, sufficient air pressure is not available from pump 81 to inject fuel into the mixing chamber 32. For this reason, fuel line 126 leading to the float bowl 65 from the fuel pump (not shown) is connected to fuel line 66 leading from the float bowl to nozzle 50 by a two-way solenoid valve 186. This valve, when energized, communicates fuel line 126 directly to fuel line 66 above the valve, as the latter is viewed in FIG. 1, and closes off the fuel line 66 below the valve. The solenoid of the valve is connected in circuit with the starter 188 so that when the starter is energized, to start the engine, the valve 186 is also energized to divert the fuel delivered by the fuel pump during starting directly to the fuel nozzle 50. The valve de-energizes with the starter and remains de-energized during normal running. When de-energized, the valve opens fuel line 66 to permit normal fuel flow from the float bowl to the nozzle and closes the direct communication between fuel lines 126 and 66.

If desired, the carburetor 10 can be equipped with a conduit 190 opening to the throat of the mixing chamber or venturi 32 for recycling or introducing blow-by from the crankcase into the chamber.

It is apparent from the preceding description that the carburetor 10 is effective to substantially reduce the exhaust emission of unburned hydrocarbons, carbon monoxide, and nitrogen oxides from an internal combustion engine. Tests conducted with a standard carburetor and the present improved atomizing carburetor, for example, yielded the following experimental data, for the same gasoline engine:

EXHAUST EMISSION FROM A TEST CAR EQUIPPED ALTERNATIVELY WITH STANDARD CARBURETOR OR FUEL ATOMIZATION DEVICE

|  | Hydrocarbons as Hexane, p.p.m. | | Carbon Monoxide (CO), percent | | Nitrogen Oxides ($NO_x$), p.p.m. | |
| --- | --- | --- | --- | --- | --- | --- |
|  | Standard Carb. | Atomization Device | Standard Carb. | Atomization Device | Standard Carb. | Atomization Device |
| Car Speed, Miles per Hour: | | | | | | |
| Idle | 450 | 180 | 2.4 | .25 | 90 | 90 |
| 20 | 550 | 200 | .55 | .20 | 1,000 | 190 |
| 30 | 300 | 105 | .35 | .10 | 1,300 | 240 |
| 40 | 120 | 70 | .30 | .10 | 1,520 | 380 |
| 50 | 75 | 45 | .50 | .10 | 1,700 | 330 |
| 60 | 55 | 20 | .55 | .15 | 1,800 | 560 |
| 70 | 30 | 15 | .60 | .20 | 2,100 | 530 |

Figure 6:
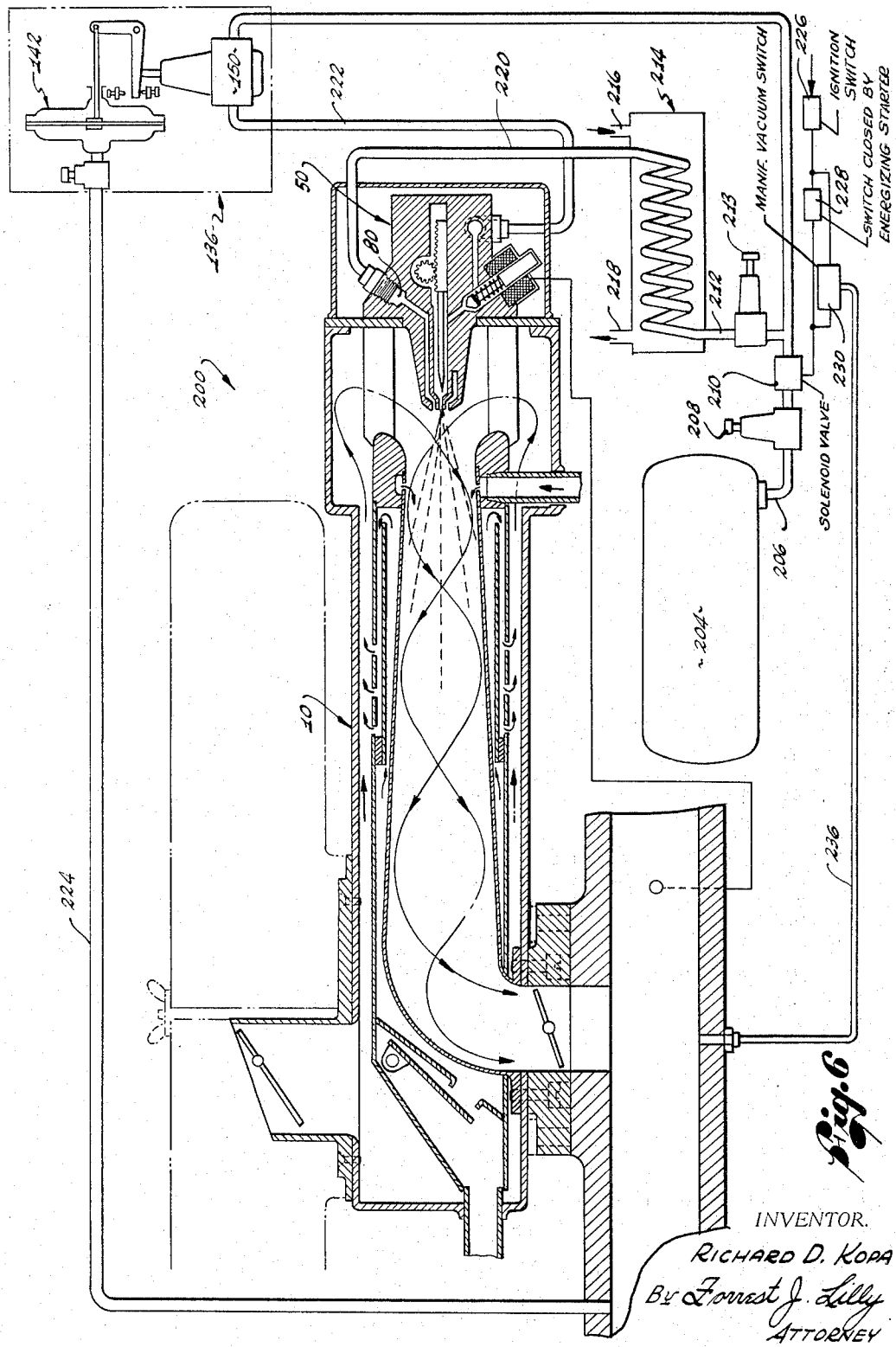
FIG. 6 illustrates an improved carburetion system according to the invention for use with a liquid petroleum fuel.

FIG. 6 illustrates a modified carburetion system according to the invention which is designed for use with liquid petroleum fuel and requires no source of pressurized air for fuel atomization or float bowl pressurization. Carburetion system 200 includes a carburetor 10 identical to the carburetor in FIG. 1. Liquid petroleum fuel is contained in a tank 204. Leading from this tank is a fuel line 206 containing a pressure regulator 208 and a solenoid valve 210. Branching off from fuel line 206 is a line 212 containing a second pressure regulator 213. Fuel line 212 bypasses a small quantity of the liquid petroleum fuel emerging from the tank 204 to a heat exchanger or vaporizer 214. This vaporizer has an inlet 216 and an outlet 218 for recirculating exhaust gas through the vaporizer, to vaporize the liquid petroleum fuel entering the heat exchanger through line 212. In an actual carburetion system, the vaporizer 214 may be incorporated directly into the exhaust system of a motor vehicle. Vaporization of the liquid petroleum fuel within the vaporizer 214 generates fuel vapor at a pressure on the order of 20 p.s.i. This fuel vapor is conducted through a line 220 to the atomizing gas inlet 80 of the fuel atomizing nozzle 50 in carburetor 10.

The remaining liquid petroleum fuel emerging from the tank 204 flows through the line 206 to the inlet of a pressure regulator 150 in a differential pressure transmitter 136 identical to the differential pressure transmitter in FIG. 1. The outlet of this regulator is connected, via a fuel line 222, to the fuel inlet 68 of the atomizing nozzle 50. The pressure transducer 142 of the transmitter 136 is connected to the intake manifold 28 through a vacuum line 224, as before. The differential pressure transmitter 136, therefore, regulates the flow of fuel to the fuel atomizing nozzle 50 in response to manifold vacuum.

In operation, the vaporized fuel entering the nozzle 50 from the heat exchanger 214 atomizes the liquid fuel entering the nozzle from the differential pressure transmitter 136. Since the fuel vapor exists at about 20 p.s.i., it emerges from the nozzle at a velocity at least equal to sonic velocity and thereby atomizes the fuel to the same small droplet size as the atomizing air in FIG. 1. The differential pressure transmitter 136 is effective to regulate fuel flow to the nozzle 50 in response to the vacuum in intake manifold 28 in substantially the same way as the transmitter 136 in FIG. 1, except, of course, the transmitter in FIG. 1 regulates fuel flow indirectly by regulating the air pressure in the float bowl and the transmitter in FIG. 6 regulates fuel flow directly. The needle valve 70 in the carburetor 10 of FIG. 6, like the needle valve in the carburetor of FIG. 1, is adjusted to regulate fuel flow in response to adjustment of the throttle valve 86 to vary engine speed. Accordingly, the carburetion system of FIG. 6 maintains the proper air-fuel ratio throughout the range of engine operation in substantially the same way as the carburetion system of FIG. 1. The operation of the carburetor 10 itself, in FIG. 6, is, of course, identical to the operation of the carburetor in FIG. 1 and, therefore, need not be repeated.

As noted earlier, the carburetion system of FIG. 6 is designed for use with a liquid petroleum fuel which is stored in the tank 204 under pressure. Accordingly, the valve 210 is required in the fuel line 206 for closing the latter when the engine is not operating. Valve 210 is controlled by three switches 226, 228 and 230. Switch 226 is connected in series with switches 228 and 230 and is operated by the ignition key so that switch 226 is closed when the ignition is turned on. Switches 228 and 230 are connected in electrical parallel. Switch 228 is solenoid operated and connected to the engine starter 234 so that the solenoid of switch 228 is energized, to close the latter, when the starter is energized to start the engine. Switch 230 is a vacuum switch which is connected through a vacuum line 236 to the intake manifold 28 so as to be closed in response to the vacuum existing in the intake manifold during starting.

When starting the engine, therefore, switch 226 closes when the ignition key is turned on and switch 228 is closed when the starter is energized, thereby energizing the solenoid of valve 210 to open the latter so that fuel can flow under pressure from the tank 204 to the nozzle 50. At this time, of course, the bell crank 148 in the differential pressure transmitter 136 is against the upper stop 154 which is set to effect the proper fuel flow through regulator 150 for idling. The manifold vacuum switch 230 closes when the manifold vacuum develops during starting so that valve 210 remains open after the switch 228 re-opens upon de-energizing of the starter.

The carburetion system of FIG. 6 can be used with gasoline powered engines by replacing the pressure regulator 208 and solenoid valve 210 by a fuel pump capable of delivering fuel at a pressure on the order of 30 p.s.i. This pump would be driven from the engine in the usual way and would replace the existing fuel pump which delivers gasoline at a somewhat lower pressure.

Figure 7:
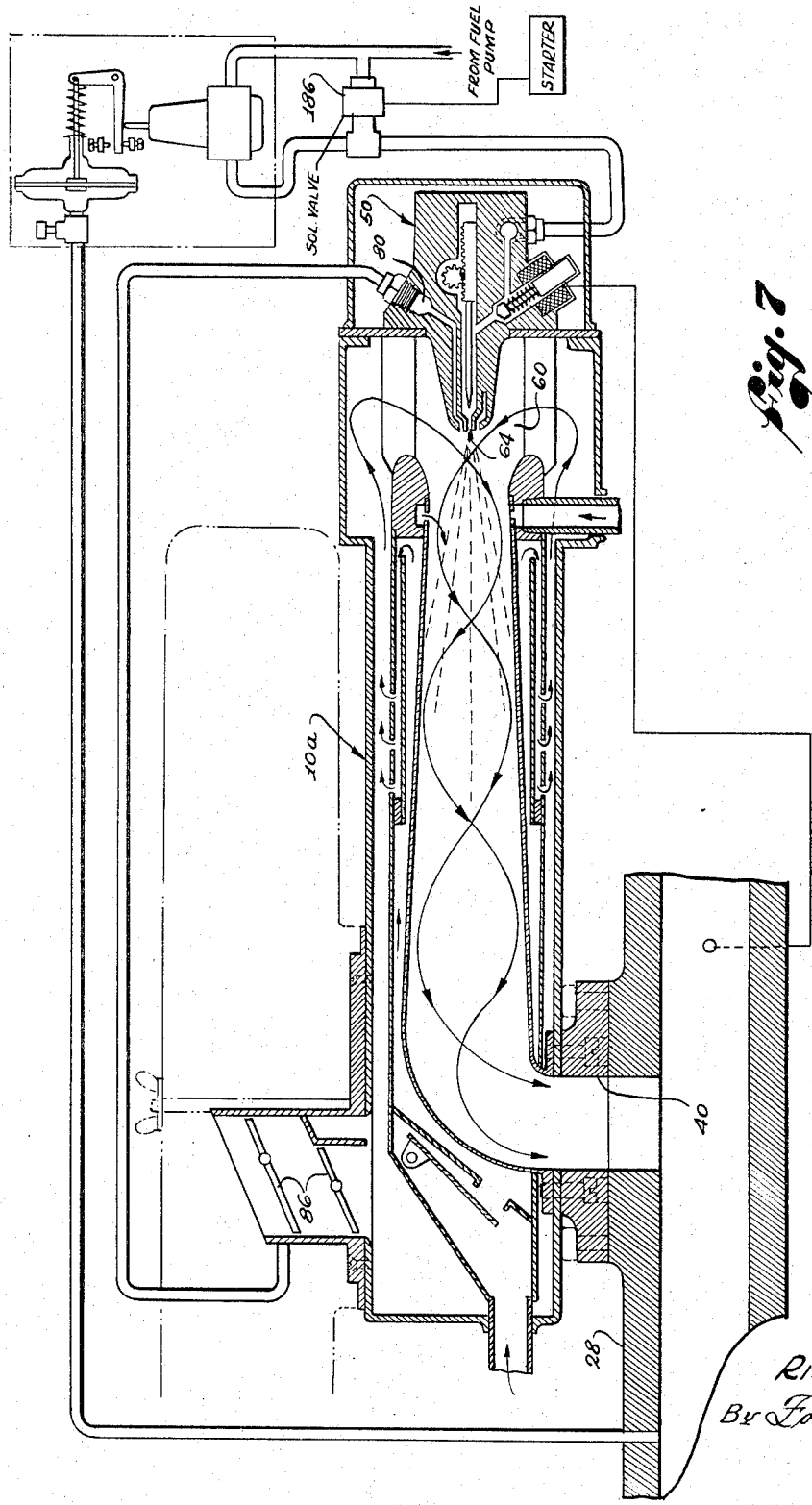
FIG. 7 illustrates a modified carburetion system according to the invention.
Figure 8:
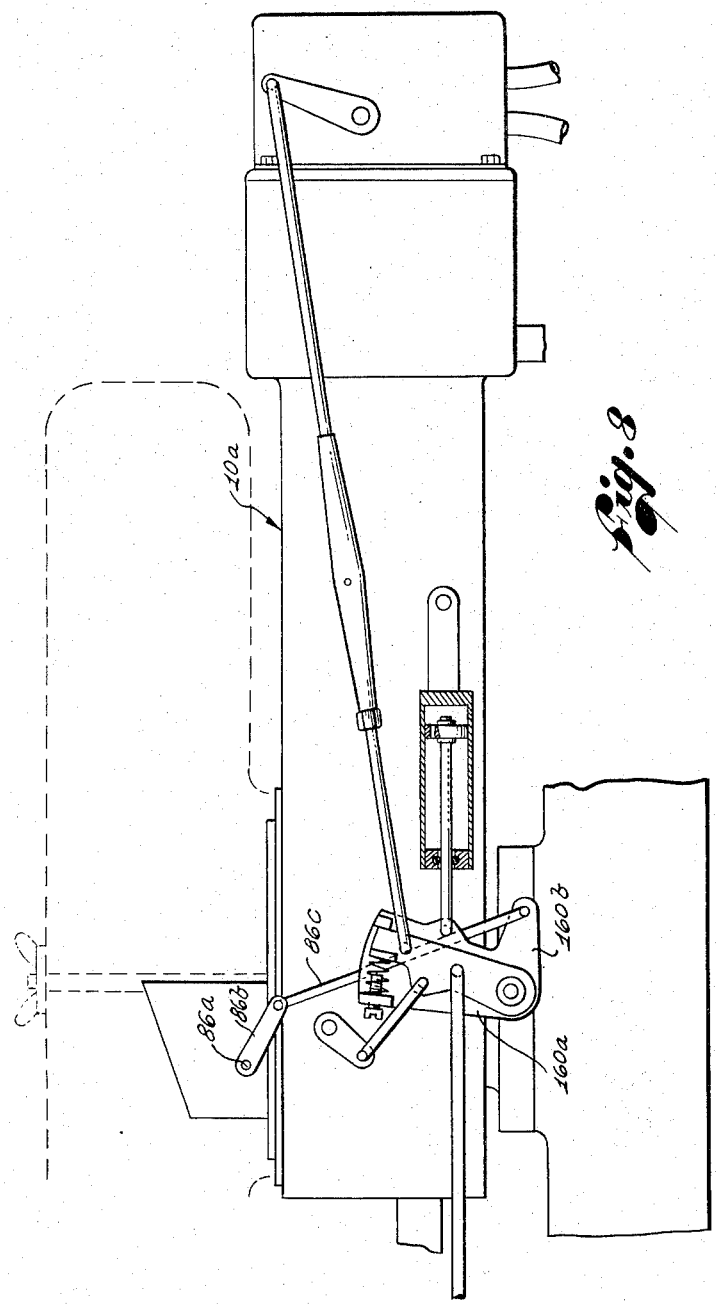
FIG. 8 is a side elevation of the improved carburetor embodied in the carburetion system in FIG. 7.

Reference is now made to FIGS. 7 and 8 which illustrate a carburetion system which uses air for atomizing the fuel but requires no compressor as does the carburetion system in FIG. 1. In FIG. 7, numeral 10a denotes a carburetor which is identical to the carburetor 10 in FIG. 1 except that in carburetor 10a, the throttle valve 86 is placed in the air horn 22 directly below the choke valve 84. The passage through the air horn is restricted at the throttle valve, as shown, to make the cross-sectional area of the passage at the throttle valve equal to the cross-sectional area of the passage 40, at the throttle valve 86, in FIG. 1. It is apparent, therefore, that during engine operation, a vacuum exists in the internal carburetor space 60 to which the atomizing nozzle orifice 64 opens, which vacuum is about the same as that in the intake manifold 28, i.e., about 15 inches of mercury.

The atomizing air inlet 80 of the nozzle 50 communicates to the interior of the air cleaner upstream of the throttle and choke valves but downstream of the filter element in the air cleaner.

The throttle valve 86 of carburetor 10a is operated from throttle arm 160a which is like throttle arm 160 in the earlier carburetor 10 except that it includes a projection 160b so that the throttle arm forms, in effect, a bell crank. Keyed on the shaft 86a of the throttle valve 86 is an arm 86b. Arms 86b and 160a are pivotally connected by a link 86c whereby the throttle valve 86 is rotated by the throttle arm 86b. The remainder of the carburetion system in FIGS. 7 and 8 is identical to that in FIG. 1 except that in the former system, fuel flow to the atomizing nozzle 50 is directly controlled by the differential pressure transmitter 136 in response to manifold vacuum, as in FIG. 6, in contrast to the indirect fuel flow control exercised by the differential pressure transmitter in FIG. 1. The fuel inlet line leading to the differential pressure transmitter 136 in FIG. 7 is connected, via a starter-controlled solenoid valve 186, to the fuel line leading from the transmitter to the nozzle 50. Valve 186 is opened to divert fuel directly from the fuel pump to the nozzle 50 when the starter is energized to start the engine. During starting, therefore, the differential pressure transmitter 136 is bypassed. After starting, the solenoid valve 186 recloses, thereby permitting the differential pressure transmitter to assume normal control of the fuel flow to the nozzle 50.

In operation, the carburetion system of FIGS. 7 and 8 functions in precisely the same way as the carburetion system in FIG. 1, except that in the former system, atomizing air flow occurs through the atomizing nozzle 50 by virtue of the vacuum which exists in the carburetor space 60 rather than because of external compression of the atomizing air delivered to the nozzle, as in FIG. 1. Since the vacuum existing in the intake manifold and, therefore, in the carburetor space 60 is about 15 inches of mercury, a critical pressure drop exists across the throttle valve and flow of atomizing air through the nozzle is sonic, as before.

In this form of the invention, as well as that of FIG. 1, the atomizing air for the fuel injection nozzle and the air for pressurizing the float bowl is extracted from the main stream of induction air after passage of the latter through the air filter. The atomizing air and float bowl pressurizing air is thus filtered, which is highly desirable, of course.

In the preceding description, all positive pressures mentioned are gauge pressures.

It is clear, therefore, that the carburetors hereinbefore described and illustrated are fully capable of attaining the several objects and advantages preliminarily set forth. While certain preferred embodiments of the invention have been disclosed, numerous modifications in the design and arrangement of parts of the invention are possible within the spirit and scope of the following claims.

I claim:

1. In a carburetor for an internal combustion engine, the combination comprising:
   a housing having an exhaust gas inlet, an air inlet, and an outlet through which the air-fuel mixture emerges from the housing,
   an elongate mixing chamber within said housing,
   a wall within said housing about said mixing chamber defining an exhaust gas passage around the chamber communicating said exhaust gas inlet to one end of said mixing chamber, whereby exhaust gas entering through the latter inlet flows along the outside of said chamber to heat the latter,
   said wall and housing forming therebetween an air passage communicating said air inlet to said one end of said mixing chamber,
   a fuel atomizing nozzle within said housing opposite said one end of said chamber for directing a stream of atomized fuel axially through the chamber, said nozzle including an atomizing gas passage terminating in an orifice opening axially toward said chamber and a fuel passage for conducting fuel into atomizing relation to gas emerging through said orifice,
   means for supplying fuel to said fuel passage,
   means for supplying atomizing gas to said gas passage under a pressure such that the gas emerges through said nozzle at a high velocity, thereby to atomize the fuel delivered to said nozzle through said fuel passage,
   a cylindrical swirl cage surrounding said one end of said mixing chamber and said nozzle, and
   said exhaust gas passage and said air passage communicating upstream of said swirl cage, and said swirl cage having tangentially directed passages through which the entering air and exhaust gas flow to said one end of said mixing chamber, whereby the air and exhaust gas undergo vortical flow through the chamber and said stream of atomized fuel is directed axially through the center of said vortical flow.

2. A carburetor according to claim 1 wherein:
   the axes of said air inlet and said mixture outlet are approximately parallel and normal to the axis of said mixing chamber, and said other end of said chamber turns at right angles to the axis of the chamber to communicate with said outlet,
   said atomizing gas supplying means deliver atomizing gas to said nozzle under a pressure such that the gas emerges through said nozzle at a velocity of the order of sonic velocity, and
   said mixing chamber being venturi-shaped and having a throat adjacent said one end of the chamber.

3. In a carburetor for an internal combustion engine, the combination comprising:
   a housing having an exhaust gas inlet, an air inlet, and an outlet through which the air-fuel mixture emerges from the housing,
   an elongate mixing chamber within said housing,
   a wall within said housing about said mixing chamber defining an exhaust gas passage around the chamber communicating said exhaust gas inlet to one end of said mixing chamber, whereby exhaust gas entering through the latter inlet flows along the outside of said chamber to heat the latter,
   said wall and housing forming therebetween an air passage communicating said air inlet to said one end of said mixing chamber,
   the other end of said mixing chamber communicating with said housing outlet,
   a fuel atomizing nozzle within said housing opposite said one end of said chamber for directing a stream of atomized fuel axially through the chamber, said nozzle including an atomizing gas passage terminating in an orifice opening axially toward said chamber and a fuel passage for conducting fuel into atomizing relation to gas emerging through said orifice,
   means for supplying fuel to said fuel passage, and
   means for supplying atomizing gas to said gas passage under a pressure such that the gas emerges through said nozzle at a high velocity, thereby to atomize the fuel delivered to said nozzle through said fuel passage.

4. In a carburetor for an internal combustion engine, the combination comprising:
- a housing having a flow duct comprising an air inlet, an outlet opening through which air-fuel mixture emerges from the housing, and
- a mixing chamber communicating at one end with said inlet opening and at the other end with said outlet opening,
- a fuel atomizing nozzle within said housing opposite said chamber for directing a stream of atomized fuel axially through the chamber, said nozzle including an atomizing gas passage terminating in an orifice opening axially toward said chamber and a fuel passage for conducting fuel into atomizing relation to gas emerging through said orifice, means for supplying fuel to said fuel passage, means for supplying atomizing gas to said gas passage under a pressure such that the gas emerges through said nozzle at a high velocity, thereby to atomize the fuel delivered to said nozzle,
- a throttle valve in said duct,
- a needle valve in said nozzle for regulating fuel flow through said fuel passage,
- means for operating said valves in unison in such manner that said needle valve progressively opens to increase fuel flow through said fuel passage in response to progressive opening of said throttle valve and said needle valve progressively closes to reduce fuel flow through said fuel passage in response to progressive closing of said throttle valve, said valve operating means including a throttle rod, a positive connection between said throttle rod and needle valve, whereby the latter is positively positioned by said rod, a spring-loaded lost-motion connection between said throttle rod and throttle valve, whereby the throttle rod imparts opening movement to the throttle valve through said spring-loaded connection, and a dashpot operatively connected between said housing and throttle valve for resisting opening movement of the latter by said rod.

5. In a carburetor for an internal combustion engine, the combination comprising:
- a housing having a flow duct comprising, an air inlet, an outlet through which air-fuel mixture emerges from the housing, and
- a mixing chamber communicating at one end with said inlet opening and at the other end with said outlet opening,
- a fuel atomizing nozzle within said housing opposite said chamber for directing a stream of atomized fuel axially through the chamber, said nozzle including an atomizing gas passage terminating in an orifice opening axially toward said chamber and a fuel passage for conducting fuel into atomizing relation to gas emerging through said orifice, means for supplying fuel to said fuel passage, means for supplying atomizing gas to said gas passage under a pressure such that the gas emerges through said nozzle at a high velocity, thereby to atomize the fuel delivered to said nozzle,
- a throttle valve in said duct,
- a needle valve in said duct said nozzle for regulating fuel flow through said fuel passage,
- means for operating said valves in unison in such manner that said needle valve progressively opens to increase fuel flow through said fuel passage in response to progressive opening of said throttle valve and said needle valve progressively closes to reduce fuel flow through said fuel passage in response to progressive closing of said throttle valve,
- said valve operating means including a first arm rigidly connected to said throttle valve for moving the latter, a second arm operatively connected to said first arm for limited relative movement with respect to the latter arm, a third arm operatively connected to said needle valve for moving the latter, a link connected between said second and third arms, whereby said needle valve is moved in response to movement of said second arm, a spring operatively connecting said first and second arms, whereby movement of said second arm in a direction to open said throttle valve is transmitted to said first arm through said spring, and a dashpot operatively connected between said housing and first arm for resisting movement of the latter in a direction to open said throttle valve, and a throttle rod operatively connected to said second arm for moving the latter.

6. In a carburetor for an internal combustion engine, the combination comprising:
- a housing having a flow duct comprising an air inlet, an outlet through which air-fuel mixture emerges from the housing, and
- a mixing chamber communicating at one end with said inlet and at the other end with said outlet,
- a fuel atomizing nozzle within said housing opposite said chamber for directing a stream of atomized fuel axially through the chamber, said nozzle including an atomizing gas passage terminating in an orifice opening axially toward said chamber and a fuel passage for conducting fuel into atomizing relation to gas emerging through said orifice, means for supplying fuel to said fuel passage, means for supplying atomizing gas to said gas passage under a pressure such that the gas emerges through said nozzle at a high velocity, thereby to atomize the fuel delivered to said nozzle,
- a throttle valve in said duct,
- a needle valve in said nozzle for regulating fuel flow through said fuel passage,
- means for operating said valves in unison in such manner that said needle valve progressively opens to increase fuel flow through said fuel passage in response to progressive opening of said throttle valve and said needle valve progressively closes to reduce fuel flow through said fuel passage in response to progressive closing of said throttle valve,
- said housing including an exhaust gas inlet and an exhaust gas passage communicating said exhaust inlet with said one end of said mixing chamber,
- an exhaust valve for controlling exhaust gas flow through said exhaust gas passage, and
- said valve operating means including a throttle rod, a positive connection between said throttle rod and said needle and exhaust valves, whereby the latter are positively positioned by said rod, a spring-loaded lost-motion connection between said throttle rod and throttle valve, whereby the throttle rod imparts opening movement to the throttle valve through said spring-loaded connection, and a dashpot operatively connected between said housing and throttle valve for resisting opening movement of the latter by said rod.

7. In a carburetor for an internal combustion engine, the combination comprising:
- housing means forming a flow duct including an air inlet, a mixture outlet, and
- an elongate mixing chamber communicating at one end with said inlet and at the other end with said outlet;
- a fuel atomizing nozzle within said housing means opposite said one end of said chamber for directing a stream of atomized fuel axially through the chamber, said nozzle including an atomizing gas passage terminating in an orifice opening axially toward said chamber and a fuel passage for conducting fuel into atomizing relation to gas emerging through said orifice,
- means for supplying fuel to said fuel passage,
- means for supplying atomizing gas to said gas passage under a pressure such that the gas emerges through said nozzle at a high velocity, thereby to atomize the fuel delivered to said nozzle through said fuel passage, said fuel supplying means comprising a fuel tank and means including a fuel line for delivering fuel from said tank to said fuel passage in said nozzle, said atomizing gas comprising vaporized fuel; and said atomizing gas supplying means comprising a conduit connecting said fuel line to said atomizing gas passage in said nozzle, and means in said conduit for vaporizing fuel flowing therethrough from said fuel line.

8. In a carburetor for an internal combustion engine, the combination comprising:

a housing having a flow duct therethrough including an air inlet, a mixing chamber communicating at one end with said inlet and an outlet through which air-fuel mixture emerges from the ducts and adapted for coupling to the intake manifold of the engine;

a fuel atomizing nozzle with fuel and air passage therein located within said housing opposite said one end of said chamber for directing a stream of pneumatically atomized fuel through the chamber;

a source of fuel under pressure connected to said fuel passage in said fuel atomizing nozzle;

a throttle valve in said flow duct;

a needle valve in said nozzle for regulating fuel flow through said fuel passage;

means mechanically linking said valves to operate in unison throughout the full range of engine operation with said needle valve progressively opening to increase fuel flow through said fuel passage in response to progressive opening of said throttle valve and said needle valve progressively closing to reduce fuel flow through said fuel passage in response to progressive closing of said throttle valve, and an auxiliary fuel control means embodying a pressure transducer including a chamber and a member responsive to pressure in said chamber, a vacuum line establishing communication between said chamber and said flow duct, downstream of said throttle, whereby said member is positioned in response to the vacuum in the intake manifold of the engine, and means operated by said member for regulating the pressure of fuel flowing from said source to said nozzle in response to said manifold vacuum in such manner that the fuel pressure increases in response to increasing manifold vacuum and decreases in response to decreasing manifold vacuum.

9. A carburetor according to claim 8 including:

a restriction in said vacuum line.

10. In a carburetor for an internal combustion engine, the combination comprising:

a housing having a flow duct including an air inlet;

a mixing chamber communicating at one end with said inlet, and an outlet adapted for coupling to the intake manifold of the engine and through which air-fuel mixture emerges from the housing;

a fuel atomizing nozzle within said housing opposite said chamber for directing a stream of atomized fuel axially through the chamber, said nozzle including an atomizing gas passage terminating in an orifice opening axially toward said chamber and a fuel passage for conducting fuel into atomizing relation to gas emerging through said orifice, means for supplying fuel to said fuel passage, means for supplying atomizing gas to said gas passage under a pressure such that the gas emerges through said nozzle at a high velocity, thereby to atomize the fuel delivered to said nozzle, a throttle valve in said duct;

a needle valve in said nozzle for regulating fuel flow through said fuel passage;

means for operating said valves in unison in such manner that said needle valve progressively opens to increase fuel flow through said fuel passage in response to progressive opening of said throttle valve and said needle valve progressively closes to reduce fuel flow through said fuel passage in response to progressive closing of said throttle valve;

means for supplying fuel to said nozzle including a float bowl; and means for regulating pressure of fuel to said nozzle including means for delivering air under pressure to said float bowl to expel fuel therefrom to said nozzle, and means including a vacuum line having communication with the intake manifold of said engine for regulating the air pressure in said bowl in response to the vacuum in said manifold in such manner that said air pressure is increased to increase fuel pressure in response to increasing manifold vacuum and decreased to reduce fuel pressure in response to decreasing manifold vacuum.

References Cited

UNITED STATES PATENTS

| | | | |
|---|---|---|---|
| 611,813 | 10/1898 | Morconnett | 261 |
| 1,432,751 | 10/1922 | Hallett | 123—119 |
| 1,615,111 | 1/1927 | Cuff | 261—50 |
| 1,897,967 | 2/1933 | Bruckner. | |
| 1,901,849 | 3/1933 | Moore. | |
| 2,047,570 | 7/1936 | Wiltshire | 239—405 |
| 2,056,615 | 10/1936 | Moore | 261—78 X |
| 2,349,676 | 5/1944 | Pratt | 261—16 |
| 2,532,554 | 12/1950 | Joeck. | |
| 2,555,200 | 5/1951 | Nemnich | 123—119 X |
| 2,655,356 | 10/1953 | Borcherts | 261—79 X |
| 2,971,749 | 2/1961 | Leibing | 261—16 X |
| 3,143,401 | 8/1964 | Lambrecht. | |
| 3,248,097 | 4/1966 | DeRugeris | 261—51 |

FOREIGN PATENTS

| | | |
|---|---|---|
| 26,717 | 4/1909 | Sweden. |

RONALD R. WEAVER, *Primary Examiner.*